(12) United States Patent
Chng et al.

(10) Patent No.: US 6,728,060 B1
(45) Date of Patent: Apr. 27, 2004

(54) DISC DRIVE WITH DELAYED REASSIGNMENT WRITE

(75) Inventors: YongPeng Chng, Singapore (SG); Patrick Tai-Heng Wong, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 350 days.

(21) Appl. No.: 09/696,467

(22) Filed: Oct. 25, 2000

Related U.S. Application Data

(60) Provisional application No. 60/162,193, filed on Oct. 28, 1999.

(51) Int. Cl.⁷ ................................................. G11B 5/58
(52) U.S. Cl. ..................... 360/77.01; 360/58; 360/78.01
(58) Field of Search ............................... 360/78.04, 58, 360/77.01, 78.01, 78.08, 78.14

(56) References Cited

U.S. PATENT DOCUMENTS

| 4,435,752 A | 3/1984 | Winkelman ................. 364/200 |
|---|---|---|
| 4,598,357 A | 7/1986 | Swenson et al. ............ 364/200 |
| 4,935,825 A | 6/1990 | Warrell et al. ................. 360/54 |
| 5,130,969 A * | 7/1992 | Sako ........................ 369/53.17 |
| 5,235,585 A | 8/1993 | Bish et al. ..................... 369/54 |
| 5,255,270 A * | 10/1993 | Yanai et al. ................. 714/710 |
| 5,271,018 A | 12/1993 | Chan .......................... 371/10.2 |
| 6,034,831 A * | 3/2000 | Dobbek et al. ............... 360/53 |

* cited by examiner

Primary Examiner—David Hudspeth
Assistant Examiner—Jason Olson
(74) Attorney, Agent, or Firm—Joseph R. Kelly; Westman, Champlin & Kelly, P.A.

(57) ABSTRACT

A method of writing to a disc in a disc drive includes receiving data to be written to a designated area of the disc wherein the designated area has a beginning, an end, and contains a defective portion. The data is written to the disc starting from the beginning of the designated area and proceeding toward the end of the designated area. The data is written to a temporary buffer, external to the disc, upon reaching the defective portion of the designated area. Writing is then resumed, writing data to the designated area of the disc, upon passing the defective portion of the designated area.

14 Claims, 4 Drawing Sheets

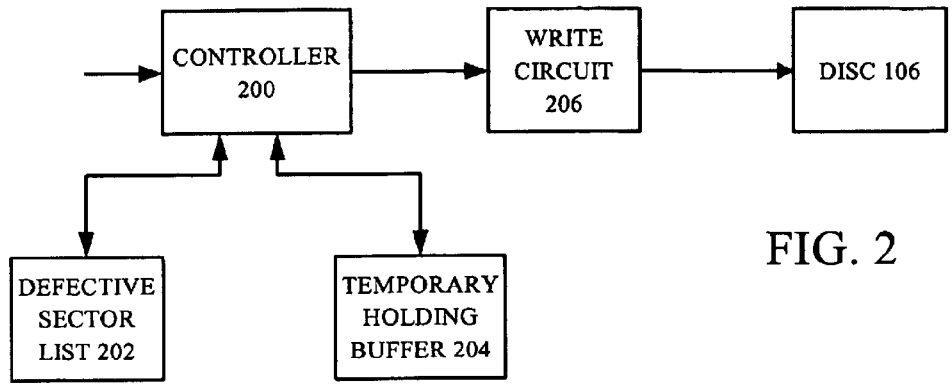
FIG. 2
FIG. 3
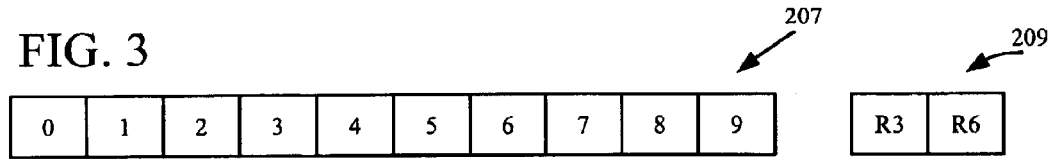
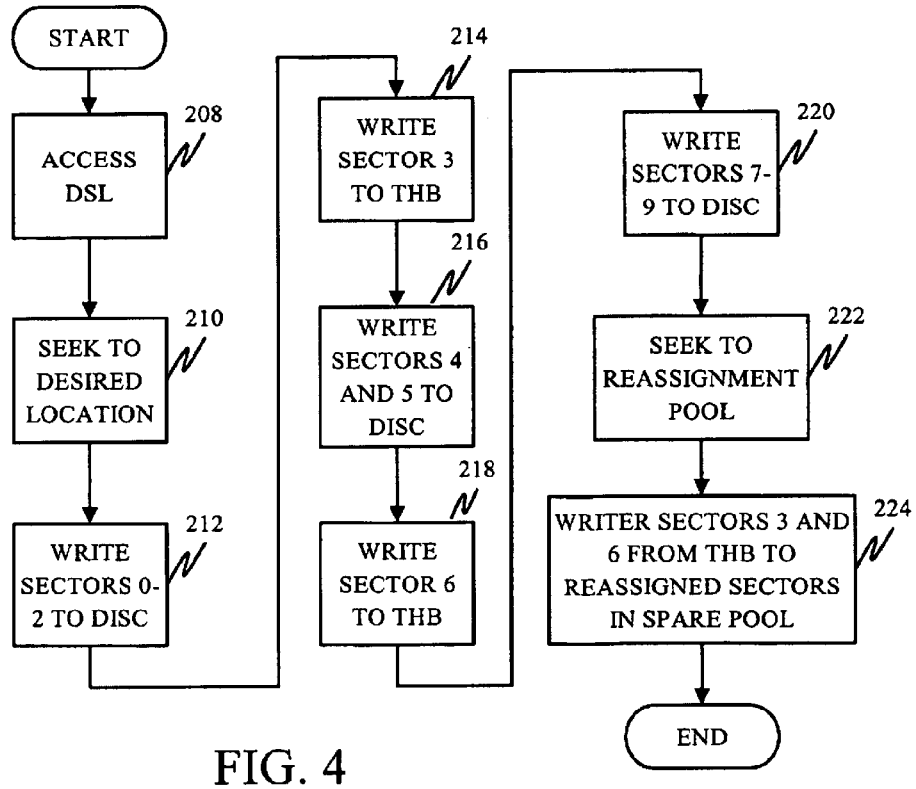
FIG. 4

DISC DRIVE WITH DELAYED REASSIGNMENT WRITE

REFERENCE TO PROVISIONAL APPLICATION

The present application refers to, and claims priority from, U.S. Provisional Patent Application No. 60/162,193, filed on Oct. 28, 1999, and entitled DELAY REASSIGNMENT WRITE.

FIELD OF THE INVENTION

The present invention relates to disc drives. More particularly, the present invention relates to writing data to a reassigned sector from a defective sector.

BACKGROUND OF THE INVENTION

A typical disc drive includes one or more transducers supported by an air bearing relative to each disc. The transducers and the air bearing are collectively referred to as a data head. A drive controller is conventionally used for controlling the disc drive system based on commands received from a host system. The drive controller controls the disc drive to retrieve information from the discs and to store information on the discs.

An actuator typically operates within a closed-loop servo system. The actuator typically includes an actuator arm that supports a flexure or flexure assembly which, in turn, supports the data head. The actuator moves the data head radially over the disc surface for track seek operations and holds the transducer directly over a track on the disc surface for track following operations. The time when the data head is near a target track and fine tuning its position just prior to commencing track following is referred to as track settle or seek settle.

Information is typically stored on the discs by providing a write signal to the data head to encode information on the surface of the disc representing the data to be stored. In retrieving data from the disc, the drive controller controls the servo actuator so that the data moves over the disc, sensing the data on the disc, and generating a read signal based on that information. The read signal is then decoded by the drive controller to recover the data represented by the information stored on the disc, and consequently represented in the read signal provided by the data head.

Data can be written to the disc in sectors. However, it sometimes happens that sectors are defective. The disc is typically verified during the manufacturing process. If the defective sectors are found during a factory defect scan, they are added to a defective sector list and they are simply skipped during assignment of logical block addresses. This is sometimes referred to as slipping the sector. In that case, as the disc drive is writing data to the disc, it simply skips those sectors when data is written.

However, it also sometimes happens that sectors become defective during normal operation of the disc, and after the factory defect scan has been performed. In that case, the sectors can not be slipped because the subsequent sectors may already have data written on them. In order to accommodate such defective sectors, the drive controller reserves a spare pool of reassignment sectors. The spare pool of reassignment sectors typically contains a number of unused sectors, near the end of the disc, which are used to replace the defective sectors.

By way of example, if the disc drive is to write ten sectors (sectors 0–9) and two sectors (sectors 3 and 6) are found to be newly defective during operation of the drive, the drive controller will reassign the logical block address of the newly defective sectors to the spare pool of reassignment sectors. Subsequent write operations in these sectors (sectors 0–9), where reassignment has been performed, requires the following sequence:

First, sectors 0–2 are written, and the write operation is stopped.

Next, the drive controller seeks to the spare pool of reassignment sectors, and sector 3 is written to the spare pool.

The drive then seeks back to the original track and writes sectors 4–5.

The write operation is again stopped, and the drive seeks to the spare pool of reassignment sectors where sector 6 is written.

Finally, the drive seeks back to the original track again where sectors 7–9 are written.

It can be seen that writing the reassigned sectors requires multiple seeks during the original write operation. This slows down the access time required to write all of the data sectors.

SUMMARY OF THE INVENTION

A method of writing to a disc in a disc drive includes receiving data to be written to a designated area of the disc wherein the designated area has a beginning, an end, and contains a defective portion. The data is written to the disc starting from the beginning of the designated area and proceeding toward the end of the designated area. The data is written to a temporary buffer, external to the disc, upon reaching the defective portion of the designated area. Writing is then resumed, writing data to the designated area of the disc, upon passing the defective portion of the designated area.

In one illustrative embodiment, the disc includes a reassignment portion located discontiguously from the designated area where the data is to be written. The write operation to the designated portion of the disc is completed and then the drive seeks to a reassignment portion of the disc. Data is then written from the temporary buffer to the reassignment portion of the disc.

In yet another illustrative embodiment, prior to writing data to the temporary buffer, it is determined whether the temporary buffer is full. If so, the drive seeks to the reassignment portion of the disc and writes the data from the temporary buffer to the reassignment portion, prior to completing the write operation in the designated area. In still another illustrative embodiment, the drive does not seek to the reassignment portion of the disc until the temporary buffer is full.

BRIEF DESCRIPTION OF THE DRAWINGS

FIG. 2 is a more detailed block diagram of a portion of the disc drive shown in FIG. 1.

FIG. 3 illustrates 10 data sectors to be written, wherein sectors 3 and 6 have been newly discovered to be defective.

FIG. 4 is a block diagram illustrating a write operation in accordance with the present invention.

DETAILED DESCRIPTION OF ILLUSTRATIVE EMBODIMENTS

Figure 1:
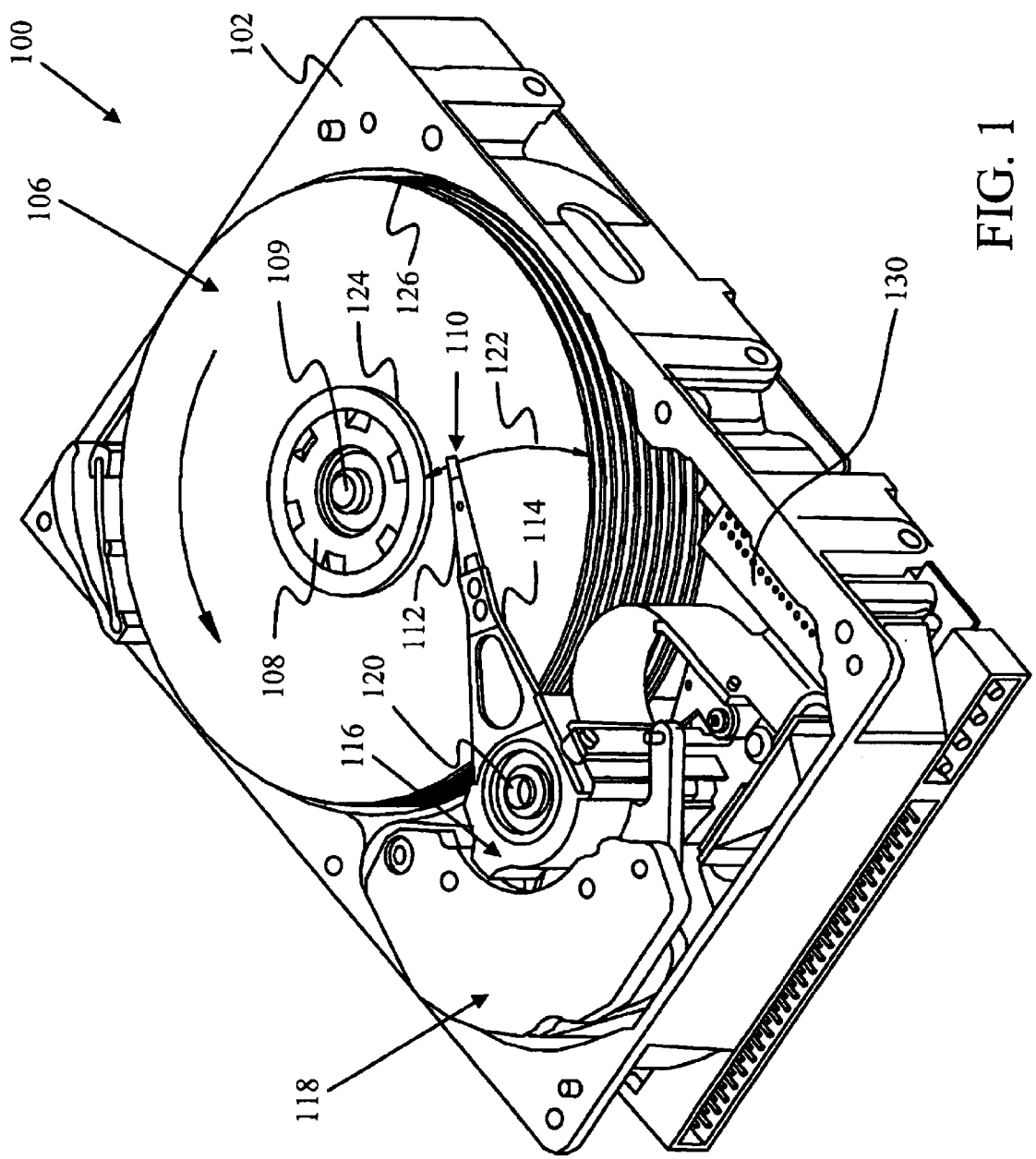
FIG. 1 illustrates one embodiment of a disc drive in accordance with the present invention.

FIG. 1 is a perspective view of a disc drive 100 in which the present invention is useful. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs, which are mounted for co-rotation about central axis 109. Each disc surface has an associated disc head slider 110 which is mounted to disc drive 100 for communication with the disc surface. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached heads 110 about a pivot shaft 120 to position heads 110 over a desired data track along an arcuate path 122 between a disc inner diameter 124 and a disc outer diameter 126. Voice coil motor 118 is driven by servo electronics 130 based on signals generated by heads 110 and a host computer (not shown).

FIG. 2 is a more detailed block diagram of a portion of the disc drive shown in FIG. 1. FIG. 2 illustrates drive controller 200, defective sector list 202, temporary holding buffer 204, write circuit 206 and disc 106. Controller 200 is illustratively a digital computer, microprocessor, microcontroller, or other similar control device. Defective sector list 202 is illustratively either a solid state, integrated circuit, memory which contains a list of the defective sectors on disc 106, or a designated portion of disc 106 which contains the list of defective sectors thereon. Temporary holding buffer 204 is illustratively a solid state, integrated circuit memory, or other memory device which is accessible by controller 200, without doing a seek on disc 106. Write circuit 206 illustratively includes amplification and signal conditioning circuitry, as well as a write head.

In general, data to be written to disc 106 is provided to controller 200, along with the desired location (e.g., target track) for the data on disc 106. Controller 200 then causes the servo system to seek to the desired location such that write circuit 206 can access the desired location on disc 106. Assuming no sectors are defective, and once the servo system has seeked to the proper track, controller 200 provides the data to write circuit 206, which writes the data to disc 106.

The operation of the disc drive system shown in FIG. 2 will now be described where sectors have been newly discovered to be defective. FIG. 3 illustrates 10 sectors (0–9) 207 which are to have data written to them. FIG. 3 further shows that sectors 3 and 6 have been recently found to be defective and have been reassigned as sectors R3 and R6 in a reassignment pool of sectors 209.

FIG. 4 is a flow diagram illustrating writing of data to sectors 0–9, shown in FIG. 3, in accordance with one illustrative embodiment of the present invention. First, controller 200 accesses defective sector list 202 based upon the desired location for the information to be written on disc 106. This is indicated by block 208 in FIG. 4. Controller 200 finds that sectors 3 and 6 are defective, and are contained within the span of the desired location for data in the current write operation.

The disc drive then seeks to the desired location on disc 106 such that write circuit 206 can access the location to be written. This is indicated by block 210.

Once write circuit 206 is positioned appropriately with respect to disc 106, controller 200 provides data to write circuit 206 to write sectors 0–2 to disc 106. This is indicated by block 212 in FIG. 4. Then, rather than seeking to the reassignment sectors 209 to write sector 3, controller 200 simply writes sector 3 to temporary holding buffer 204. Recall that a temporary holding buffer 204 can be accessed by controller 200 without causing the disc drive to seek to another location. Writing sector 3 to the temporary holding buffer 204 is illustrated by block 214 in FIG. 4.

After sector 3 has been written to temporary holding buffer 204, controller 200 continues writing to disc 106. Thus, controller 200 writes data to sectors 4 and 5 on disc 106, as indicated by block 216.

Next, rather than seeking to the reassignment sectors 209 to write the data for sector 6, controller 200 simply accesses temporary holding buffer 204 and writes the data for sector 6 in the temporary holding buffer 204. This is indicated by block 218.

After the data for sector 6 is written to temporary holding buffer 204, controller 200 again continues writing to disc 106. Controller 200 thus writes the data to sectors 7–9 on disc 106 as indicated by block 220. After all of the data has been written (either to disc 106 or to temporary holding buffer 204), the disc drive seeks to the spare pool of reassignment sectors 209. This is indicated by block 222 in FIG. 4. Once write circuit 206 is positioned at the next available reassignment sector, controller 200 retrieves the data which was originally intended for defective sectors 3 and 6, from temporary holding buffer 204, and provides that data to write circuit 206. Thus, the data originally intended for sectors 3 and 6 is written to the reassigned sectors R3 and R6 in the spare pool of sectors 209. This is indicated by block 224 in FIG. 4.

It can thus be seen that writing all of the data for sector 0–9 can be done by simply doing an initial seek to sector 0, writing data to all of the valid sectors, and then doing one additional seek to the spare pool of reassignment sectors 209 and writing the data originally intended for defective sectors to the spare pool. This greatly reduces the seek latency required for writing data to an area of disc 106 which contains defective sectors.

Figure 5:
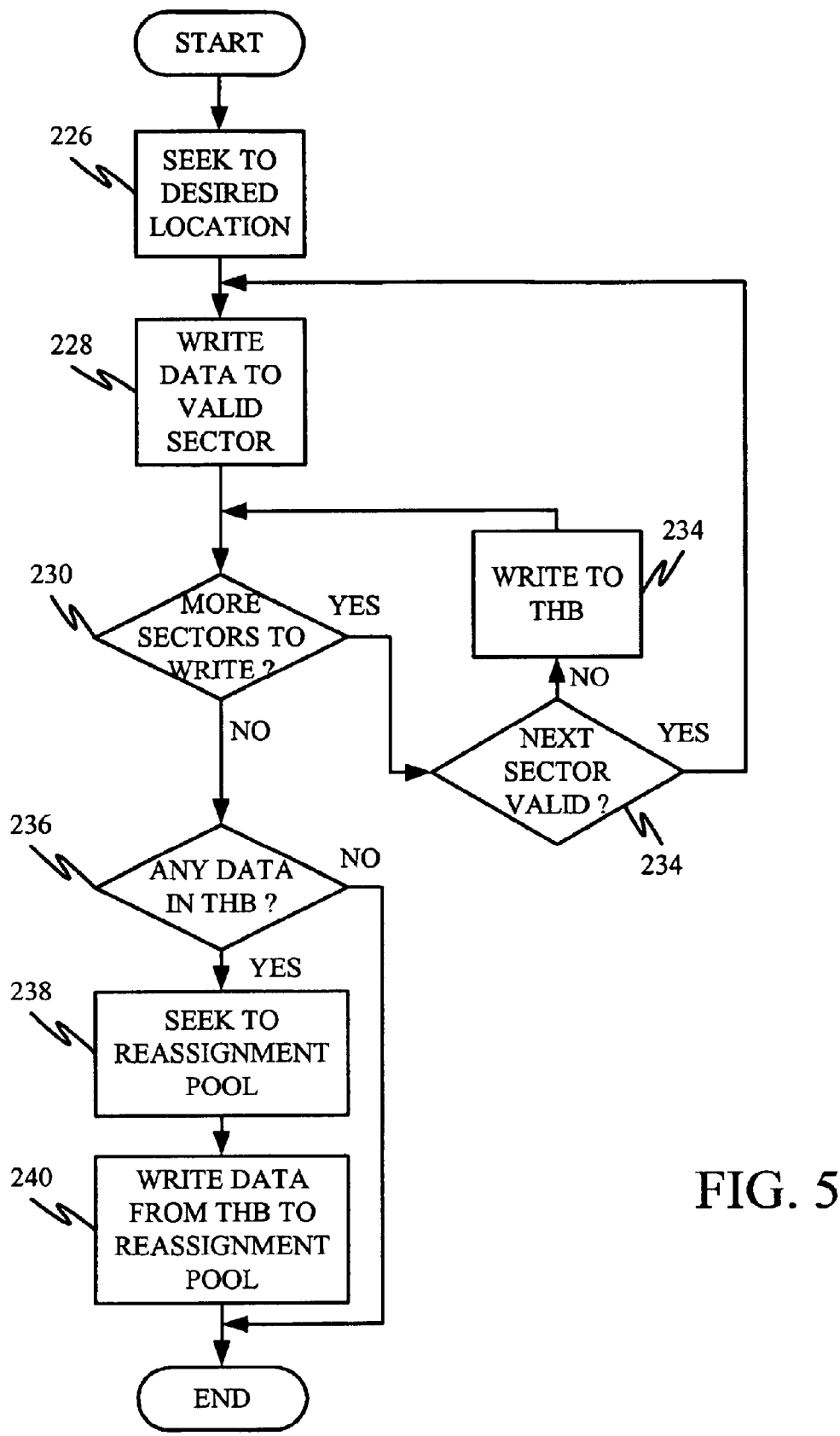
FIGS. 5 and 6 are flow diagrams illustrating write operations in accordance with various embodiments of the present invention.

FIG. 5 is a flow diagram which illustrates one embodiment of the present invention more generally than that shown in FIG. 4. First, the disc drive seeks to the desired location for the data to be written. This is indicated by block 226 in FIG. 5. Next, drive controller 200 writes data to a valid sector at the desired location. This is indicated by block 228. Controller 200 then determines whether there are additional sectors to be written, as indicated by block 230. If so, controller 200 determines whether the next sector to be written is valid. This is indicated by block 232. If so, the data is simply written to that sector as indicated at block 228.

However; if at block 232 it is determined that the next sector to be written on disc 106 is not valid, but is defective, then drive controller 200 writes data intended for that sector to temporary holding buffer 204. This is indicated by block 234. After the data is written to temporary holding buffer 204, controller 200 again determines whether there is additional data to be written to disc 106, as indicated by block 230. This process continues until the entire write operation has been completed (either to disc 106 or to temporary holding buffer 204).

Once, at block 230, it is determined that there are no additional sectors to write, then controller 200 determines whether it has written any data to temporary holding buffer 204. This is indicated by block 236. If not, the write operation is completed. If so, however, then the disc drive seeks to the reassignment pool for the data which is currently in the temporary holding buffer 204. This is indicated by block 238. Once write circuit 206 is properly positioned over the reassignment pool, controller 200 provides the data from temporary holding buffer 204 to write circuit 206 such that data can be written to the reassignment pool on disc 106. This is indicated by block 240.

It can thus be seen that the seek latency associated with the write operation is greatly reduced over conventional write operations.

Figure 6:
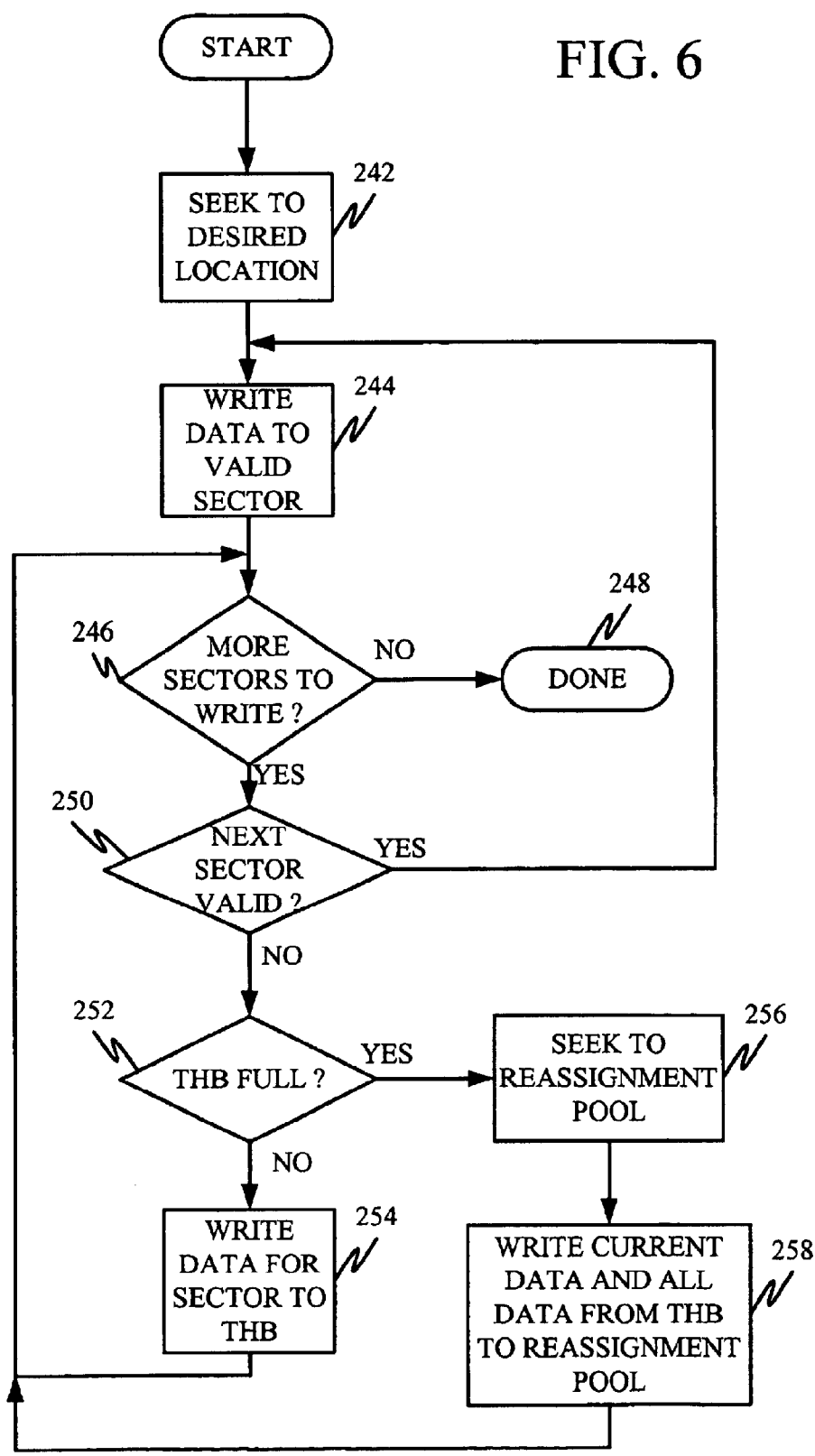

FIG. 6 is another block diagram illustrating yet another method of writing data in accordance with one illustrative embodiment of the present invention. The operation corresponding to FIG. 6 is similar to that shown with respect to FIG. 5, except that drive controller 200 waits until temporary holding buffer 204 is full, before it seeks to the reassignment tracks, at which point it writes all data from temporary holding buffer 204 to the reassignment tracks. Specifically, the disc drive first seeks to the desired location for the specified write operation. This is indicated by block 242 in FIG. 6. Assuming the first sector to be written on disc 106 is valid, controller 200 writes the data to the valid sector on disc 106, as indicated by block 244. Of course, if the first sector to be written is invalid, drive controller 200 simply writes that information to temporary holding buffer 204.

Drive controller 200 then determines whether there is any additional data to be written as indicated by block 246. If not, then the write operation is completed, as indicated by block 248.

However, if at block 246 it is determined that there is additional data to be written, drive controller 200 accesses defective sector list 202 to determine whether the next sector is valid. This is indicated by block 250. If so, drive controller 200 simply writes the data to that valid sector and processing continues to block 244.

However, if at block 250 it is determined that the next sector is not valid, then controller 200 accesses temporary holding buffer 204 to determine whether temporary holding buffer 204 is full. This is indicated by block 252. If the temporary holding buffer is not full, then drive controller 200 simply writes the data originally intended for the defective sector to temporary holding buffer 204, as indicated by block 254, and processing continues at block 246 where controller 200 determines whether there are any additional sectors to be written.

However, if at block 252, it is determined that temporary holding buffer 204 is full, then the disc drive seeks to the spare pool of reassignment sectors. This is indicated by block 256 in FIG. 6. Once write circuit 206 is appropriately positioned relative to the spare pool of reassignment sectors, controller 200 writes the current data, which was originally intended for a defective sector, along with all of the data from temporary holding buffer 204, to the spare pool of reassignment sectors on disc 106. This is indicated by block 256. It can thus be seen that this system for writing data to disc 106 even further decreases the seek latency required for such an operation.

Therefore, in accordance with one aspect of the present invention, data is written to a disc 106 in a disc drive 100 by first receiving data to be written to a designated area of the disc 207 which has a beginning, an end, and contains a defective portion (207-3 and 207-6). The data is written to the disc 106 starting from the beginning of the designated area 207 and proceeds towards the end of the designated area 207. The data is written to a temporary buffer 204 external to the disc 106 upon reaching the defective portion of the designated area 207. Writing is resumed at the designated area 207 of the disc 106 upon passing the defective portion of the designated area 207.

In one illustrative embodiment, writing the data to the designated portion 207 of disc 106 is completed and then drive 100 seeks to a reassignment portion 209 of disc 106. The data is written from the temporary buffer 204 to the reassignment portion 209 after seeking to the reassignment portion 209 of disc 106.

In one illustrative embodiment, prior to seeking to reassignment portion 209, drive controller 200 determines whether temporary buffer 204 is full. If so, the drive 100 seeks to reassignment portion 209 prior to continuing writing at the designated area 207.

In yet another embodiment, the disc 106 has a plurality of defective portions (207-3 and 207-6) and data is written to temporary buffer 204 upon reaching each of the plurality of defective portions of disc 106. Writing is again resumed at designated area 207 upon passing each of the plurality of defective portions of disc 106.

In yet another embodiment, drive 100 includes a defective sector list 202. Drive controller 200 receives an indication of a target track as the designated area 207 and the defective portions 207-3 and 207-6 comprise defective sectors in the designated area 207. Drive controller 200 illustratively obtains an indication of the defective sectors from defective sector list 202.

In still another embodiment, temporary holding buffer 204 is a solid state memory, integrated circuit device.

The present invention can also be implemented as an apparatus wherein a controller is configured to perform the writing steps discussed above.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the write operation while maintaining substantially the same functionality without departing from the scope and spirit of the present invention.

What is claimed is:

1. A method comprising steps of:
   determining whether a temporary buffer external to a storage medium is full upon reaching a defective portion of the storage medium, where:
   if the temporary buffer is full, seeking to a reassignment portion of the storage medium, writing data associated with the defective portion and data in the temporary buffer to the reassignment portion, and
   if the temporary buffer is not full, writing the data associated with the defective portion to the temporary buffer; and
   resuming writing data to the storage medium upon passing the defective portion.

2. The method of claim 1 further comprising steps of:
   completing writing data to the storage medium;
   if data is in the temporary buffer, seeking to the reassignment portion; and
   (g) writing data from the temporary buffer to the reassignment portion after seeking to the reassignment portion.

3. The method of claim 2 wherein the storage medium has a plurality of defective portions and wherein the step of writing to the temporary buffer comprises a step of:

writing the data to the temporary buffer upon reaching each of the plurality of defective portions.

4. The method of claim 3 wherein the resuming step comprises a step of:

resuming writing the data to the storage medium upon passing each of the plurality of defective portions.

5. The method of claim 1 further comprising the step of:

receiving an indication of a target track as a designated area, wherein the defective portion comprises a defective sector, and wherein it is determined that a portion of the target track is located in the defective sector.

6. The method of claim 5 wherein the receiving step further comprises a step of:

obtaining an indication of the defective sector.

7. The method of claim 1 wherein the temporary buffer is a solid state memory device.

8. An apparatus, comprising:

a storage medium;

a write component positioned relative to the storage medium to write data on the storage medium; and a controller, coupled to the write component and configured to perform steps of:

determining whether a temporary buffer external to the storage medium is full upon reaching a defective portion of the storage medium;

if the temporary buffer is full, seeking to a reassignment portion of the storage medium, writing the data and data in the temporary buffer to the reassignment portion; and if the temporary buffer is not full, writing the data associated with the defective portion to the temporary buffer; and resuming writing the data to the storage medium upon passing the defective portion.

9. The apparatus of claim 8 wherein the controller is further configured to perform steps of:

completing writing data to the storage medium;

(f) if data is in the temporary buffer, seeking to a the reassignment portion; and (g) writing the data from the temporary buffer to the reassignment portion after seeking to the reassignment portion.

10. The apparatus of claim 9 wherein the storage medium has a plurality of defective portions and wherein the controller is configured to perform the step of writing to the temporary buffer by:

writing data associated with each of the plurality of defective portions to the temporary buffer upon reaching each of the plurality of defective portions.

11. The apparatus of claim 10 wherein the controller is configured to perform the resuming step by:

resuming writing the data to the storage medium upon passing each of the plurality of defective portions.

12. The apparatus of claim 8 wherein the controller is configured to perform a step of:

receiving an indication of a target track as a designated area, wherein the defective portion comprises a defective sector, and wherein it is determined that a portion of the target track is located in the defective sector.

13. The apparatus of claim 12 and further comprising a defective sector store containing a defective sector list listing defective sectors and wherein the controller is configured to perform the receiving step by:

obtaining an indication of the defective sector from the defective sector list in the defective sector store.

14. The apparatus of claim 8 wherein the temporary buffer comprises:

a solid state, integrated circuit, memory device.

* * * * *

UNITED STATES PATENT AND TRADEMARK OFFICE
CERTIFICATE OF CORRECTION

PATENT NO. : 6,728,060 B1  
DATED : April 27, 2004  
INVENTOR(S) : YongPeng Chng et al,.

It is certified that error appears in the above-identified patent and that said Letters Patent is hereby corrected as shown below:

Column 8,
Line 4, after "to" delete -- a --

Signed and Sealed this

Twenty-seventh Day of July, 2004

JON W. DUDAS
*Acting Director of the United States Patent and Trademark Office*